United States Patent [19]

Young et al.

[11] 4,045,180

[45] Aug. 30, 1977

[54] APPARATUS FOR COPOLYMERIZING GASEOUS MONOMERS

[75] Inventors: Robert Hayward Young, Somerville; Markus Matzner, Edison, both of N.J.

[73] Assignee: Union Carbide Corporation, New York, N.Y.

[21] Appl. No.: 693,131

[22] Filed: June 4, 1976

[51] Int. Cl.² ............................ B01J 1/00; C08F 2/00
[52] U.S. Cl. ........................... 23/260; 23/253 A; 23/285; 137/3; 137/255; 137/266; 526/87; 260/878 B; 260/880 B; 260/77.5 TB; 259/4 R; 259/78; 259/107; 260/876 B
[58] Field of Search .............. 23/260, 253 A, 285; 137/3, 255, 266; 526/87; 260/95 R, 857 B, 876 B, 878 B, 880 B, 77.5 TB, 77.5 AA; 259/4 R

[56] References Cited

U.S. PATENT DOCUMENTS

| 3,452,119 | 6/1969 | Hinton | 260/880 B |
| 3,463,616 | 8/1969 | Corradi et al. | 23/260 X |

Primary Examiner—James H. Tayman, Jr.
Attorney, Agent, or Firm—Francis M. Fazio

[57] ABSTRACT

Apparatus for copolymerizing at least two gaseous monomers to form block copolymers or gradient copolymers comprising a closed reactor for receiving the monomers and subjecting them to copolymerizing conditions, at least three feed tanks for containing the monomers under pressure, a first feed manifold connecting one end of each feed tank to the reactor, first valve means in the first manifold for controlling flow therein between the first and second feed tank, between the second and third feed tank and between the feed tanks and the reactor, a second feed manifold connecting the other end of each feed tank to the reactor, and second valve means in the second manifold for controlling flow from each feed tank into the second manifold.

9 Claims, 1 Drawing Figure

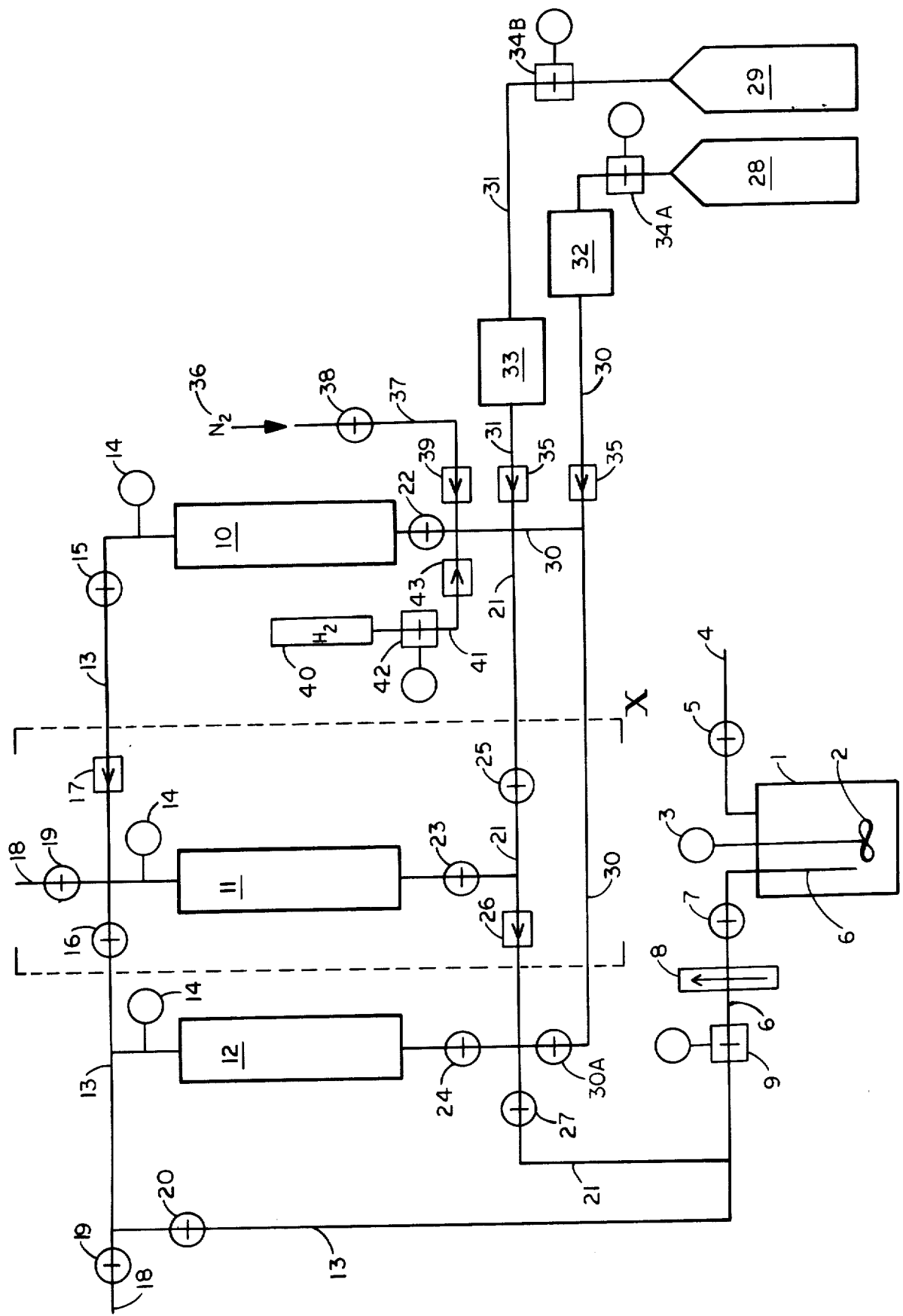

APPARATUS FOR COPOLYMERIZING GASEOUS MONOMERS

BACKGROUND OF THE INVENTION

1. Field of the Invention

The invention relates to apparatus for copolymerizing at least two gaseous monomers which permits the precise control over the introduction of the type and amount of gaseous monomer into a reaction chamber for copolymerization. The apparatus of the present invention is useful in copolymerizing olefinic monomers, such as propylene and ethylene, although any other gaseous monomers including ethylene oxide and propylene oxide can be copolymerized in it. The apparatus of the present invention further is useful in producing gradient copolymers in which the composition of the copolymer varies gradually along the copolymer chain. It can also be used for producing block copolymers which comprise polymerized blocks of one comonomer connected to polymerized blocks of another comonomer. The invention is also useful in the copolyerization of comonomers in random fashion and permits accurate and precise controls over the amount and type of monomer being copolymerized at any given time.

2. Description of the Prior Art

Heretofore, previous techniques and apparatus for mixing two gaseous monomers involved either a constant composition controlled by relative partial pressures in a reactor or involved occasional pulsing of one gaseous monomer into the other gaseous monomer line leading to the reactor. Such prior art techniques and apparatus were difficult to control because of the lack of means for regulating precisely the flow of the respective gaseous comonomers into the reactor. Furthermore, the prior art apparatus was not able to produce gradient copolymers wherein the composition changes gradually and continually along the polymer chain. No prior art is known to exist which represents a way to control precisely the composition of the gaseous monomer mixture sent to the reactor and to continually vary this composition over a predetermined compositional profile.

Bassett et al., U.S. Pat. No. 3,804,881, and Knopf et al., U.S. Pat. No. 3,839,293, disclose the process of continuously introducing a primary polymerizable feed composition from a primary feed source to a polymerization zone, wherein the primary polymerizable feed composition is continually varying in compositional content during the continuous introduction; a different secondary polymerizable feed composition from a secondary feed source is simultaneously added to the primary feed source so as to continually change the compositional content of reactants in the primary feed source; and the reactants introduced to the polymerization zone are polymerized.

Neither of these patents discloses, teaches or suggests the apparatus of this invention.

British Pat. No. 1292226 relates to the manufacture of ion exchange resins by polymerizing styrene and divinylbenzene (DVB) in bead form in steps of increasing DVB content in order to maintain a given DVB level in the bead because of the greater reactivity of DVB compared to styrene. This patent does not teach, disclose or suggest the apparatus of this invention.

SUMMARY OF THE INVENTION

The present invention provides an apparatus for copolymerizing at least two gaseous monomers which permits the precise control of feed of a comonomer mixture to the reactor to produce a copolymer in which the composition along its chain varies gradually. The apparatus of the present invention is also useful in the production of block copolymers. Furthermore, the novel apparatus of this invention can be equipped with means for easily adding chain transfer agents and can be easily and readily purged with inert gases, such as nitrogen.

The apparatus comprises a closed reactor for receiving the monomers and subjecting them to copolymerizing conditions. At least three feed tanks of predetermined volume are provided for maintaining the monomers under pressure and under conditions which preclude copolymerization. A first feed manifold connects one end of each feed tank to the reactor. There is also provided first valve means in the first feed manifold for controlling the flow in the first manifold between the first and second feed tanks, between the second and third tanks and between the feed tanks and the reactor. A second feed manifold connects the other end of each feed tank to the reactor. Second valve means are provided in the second manifold to control the flow from each of the three feed tanks into the second feed manifold. Multiple sets of feed tanks 10, 11, 12 and supply sources 28, 29 together with the associated piping, valves and pressure gauges as shown in the figure can be connected to reactor 1 as shown to permit continuous operation while recharging one set and using the other.

The apparatus of the present invention is also provided with third valve means for controlling flow in the second manifold from the feed tanks to the reactor. There can also be provided means for connecting the second manifold to a source of each of the gaseous monomers for the purpose of filling the feed tanks with said gaseous monomers and, optionally, for feeding one or more of the gaseous monomers directly to the reactor and controlling the polymerization of gaseous monomers. Preferably, there are check valves disposed between the sources of gaseous monomers and the feed tanks to permit flow from said sources to the feed tanks but not from the feed tanks back to the sources. In addition, the apparatus can be provided with a check valve in the first manifold between the first and second feed tank permitting flow therein from the first to the second feed tank but not from the second to the first. A check valve is also advantageously provided in the second manifold between the second and third feed tanks to permit flow in the manifold from the second to the third feed tank but not from the third to the second. As pointed out hereinbefore, the apparatus can also be provided with connection to a source of chain transfer agent such as hydrogen gas to admit such transfer agent into one of said manifolds through a check valve which permits the material to pass into the manifolds and thence to the reactor but precludes flow from the manifold to the chain transfer agent source. There is also preferably provided a source of inert gas, such as nitrogen, connected to one of the manifolds through a check valve for permitting the inert gas to pass into the second manifold and thence throughout the system for purging purposes but prevents flow from the second manifold back to the source of inert gas. It has been found to be useful to provide pressure regulator means at the sources of gaseous monomers for the regulation of the flow of gaseous monomers into one or more feed tanks and/or into the reactor. It is also advantageous to provide a pressure regulating means between the reactor and the manifolds for regulating the flow of gaseous monomers into the reactor.

BRIEF DESCRIPTION OF THE DRAWING

The drawing is a schematic diagram illustrating the apparatus of the present invention.

DESCRIPTION OF A PREFERRED EMBODIMENT

In the drawing, a reactor 1 is provided with a stirrer 2, a pressure gauge 3, an effluent gas line 4, the flow in which is controlled by valve 5, and an inlet gas line 6 the flow in which is controlled by valve 7. If desired, a flow meter 8 can be provided in inlet gas line 6. It is preferred to provide a pressure regulator 9 in inlet gas line 6.

The apparatus also includes three feed tanks 10, 11 and 12. One end of the feed tanks 10, 11 and 12 is connected to a first feed manifold 13. Pressure gauges 14 are installed in the manifold 13 adjacent each feed tank. Valves 15 and 16 are placed in the first feed manifold, respectively, between tanks 10 and 11 and tanks 11 and 12. A check valve 17 is provided in the first feed manifold between tank 10 and 11. Exhaust lines 18 having valves 19 are provided for the purpose of purging the system. Another valve 20 is provided in the manifold 13 to control the flow between the feed tanks 10, 11 and 12 and the reactor 1.

The other end of each feed tank is connected to a second feed manifold 21. Valves 22, 23 and 24 are provided in the second feed manifold adjacent feed tanks 10, 11 and 12, respectively. In addition, valve 25 is placed in the second feed manifold between tank 10 and tank 11. Check valve 26 is disposed between tanks 11 and 12. Valve 27 is provided in the second feed manifold between feed tanks 10, 11, 12 and reactor 1 to control the flow from said tanks to the reactor. Sources of supply 28 and 29 of gaseous monomer are connected to the second feed manifold by means of supply lines 30 and 31. Valve 30A is disposed in supply line 30 adjacent tank 12 to control the flow of gaseous monomer into tank 12. Drying columns 32 and 33 are provided in the supply lines 30 and 31 for the purpose of removing moisture from the gases before they enter the system. In addition, pressure regulators 34A and 34B and check valve 35 are provided for the purpose of regulating and controlling the flow of gases from sources of supply 28 and 29, respectively, to the second feed manifold.

A source of supply of inert gas, such as nitrogen 36 is connected by inert gas line 37 to the second feed manifold. A valve 38 and a check valve 39 in the inert gas line 37 control the flow of inert gas therein. A source of chain transfer agent, such as hydrogen 40, is connected by line 41 to the second feed manifold. A pressure regulator 42 and a check valve 43 are disposed in line 41 for the purpose of controlling and regulating flow in line 41.

The system shown in the drawing can include more than three feed tanks. This is designated in the drawing by the brackets in dashed lines and the letter X. This indicates the portion of the apparatus within the brackets can be repeated more than once, i.e., X number of times. Preferably X is 1 to 5.

In operation, the system is first purged with nitrogen by opening valve 38 to cause nitrogen to enter manifold 21. By manipulation of the various valves in the system, the nitrogen can be caused to enter all parts of the system and purge it. The valves 19 in exhaust lines 18 can be opened at suitable times and in suitable sequence to permit the purging gas to escape. In addition, the valve 5 in effluent gas line 4 can also be opened at the appropriate time to eliminate unwanted gasees from the reactor and the lines leasing to it. After purging has been completed, valves 19 and 5 are closed to close the system to the atmosphere.

Gaseous monomers from sources of supply 28 and 29 can be charged into tanks 10, 11 and/or 12, as desired, by the appropriate manipulation of valves 22 through 25 and 30A. For example, tanks 10 and 12 can be pressurized with gaseous monomer from source of supply 28 and tank 11 can be charged with gaseous monomers from source of supply 29. The converse is also possible and it is equally possible to provide any desired arrangement for the charging of tanks 10, 11 and 12. A typical arrangement is to charge tank 10 and 12 with one comonomer and tank 11 with a different comonomer. The reactor 1 is maintained at a lower pressure than tanks 10 through 12, so that feeding to the reactor 1 is accomplished by pressure alone without the need of pumps. The catalyst and solvent or other reagents, if used, are added to the reactor and the reactor is brought up to the desired reaction temperature and reaction pressure. Then a gaseous monomer is introduced through inlet line 6. This is continuously done by opening valve 20 to permit gaseous monomer from feed tank 12 to enter reactor 1 and polymerize.

If a gradient effect is desired in the composition along the copolymer chain, tanks 10 and 12 are charged with monomer A from supply source 28, e.g., propylene, and tank 11 is charged with monomer B, e.g., ethylene, from supply source 29, or a mixture of monomers A and B. Then, valves 23 and 24 are opened (valves 27 and 30A being closed) whereby monomer B from tank 11 flows into the monomer A in tank 12 so that the proportion of monomer A is continuously decreasing in tank 12 while the proportion of monomer B in tank 12 is constantly increasing. By the same token, monomer A from tank 10 can be fed into tank 11 through the first feed manifold 13 by opening valve 15 (valves 16 and 19 remain closed). This then continuously increases the concentration of monomer A in feed tank 11. The mixtures of monomers A and B flow through manifold 13 and inlet gas line 6 into the reactor 1 and are continually gradually changing in composition as described above. As a result, the copolymer produced in reactor 1 has a chain of gradually changing composition along its length. It is preferred to maintain the reactor 1 under reactant-starved conditions so that the monomer mixture entering the reactor 1 through inlet gas line 6 copolymerizes substantially immediately and there is little or no monomer in the reactor 1 to substantially change the composition of the entering mixture before it copolymerizes.

It may also be desirable to form blocks of polymerized monomer of one type in which case the gaseous monomer A directly from tank 11, for example, can be fed through supply line 13 through valve 20 to the reactor 1 (all other valves except 7 and pressure regulator 9 being closed). This feed can be kept up for such period of time as is required to produce a block of the desired length after which time the flow from tank 12 can be discontinued. At this point a gradient copolymer portion can be introduced into the polymer chain by carrying out the procedure described above in the immediately proceding paragraph, after, of course, tank 12 has been recharged with monomer A from supply source 28.

It may be desirable to introduce a polymerized block of monomer B from source of supply 29 at a certain point along the copolymer chain. In this event, tank 12 can be charged with monomer B from source of supply 29 and then passed through first feed manifold 13 into inlet gas line 6 into reactor 1 (all other valves except 7 and 20 and pressure regulator 9 being closed).

A wide vaviety of different types of copolymers can be made by this invention simply by the appropriate manipulation of the various valves shown in the drawing. Block copolymers can be made, gradient copolymers can be made as well as random distribution copolymers. The monomer feeds to reactor 1 can be accurately controlled in the amount and composition. Feed tanks 10, 11 and 12 can be replaced with corresponding feed tanks of greater or less volumetric capacities to provide more versatility in producing a wide variety of copolymer types and yields. The apparatus is also provided with means for introducing chain transfer agents by the manipulation of pressure regulator 42 to enable the chain transfer agent, e.g., to add to the feed gases and enter reactor 1.

The pressure gauges 14 positioned at appropriate locations in the apparatus permit quantification of the amount of the respective gaseous monomers charged into each tank 10, 11 and/or 12 and into the reactor 1.

The pressure regulator 9 permits the close control of the reaction (and feed) rate and assists in keeping the reactor 1 at a lower pressure than that of the feed tanks 10, 11 and 12 throughout the reaction.

The reactor 1 is of the pressure type capable of performing the polymerization either in a slurry (organic solvent) or with a gas phase fluid-bed type reaction. If desired, more than two supply sources 28 and 29 can be connected to the system to increase its capacity or permit copolymerization of three monomers in the system.

The composition of the gaseous monomers can be varied by utilizing different charges to (pressures in) the feed tanks 10, 11 and 12 by the variation of the size of any one (or all) of the feed tanks. For example, if tank 12 is charged with propylene, tank 11 with ethylene and tank 10 with propylene; if all three tanks are of equal size; and if the contents of tank 10 is made to feed through first feed manifold 13 and valve 15 into tank 11 and the contents of tank 11 is made to feed through second feed manifold 21 and valves 23 and 24 into tank 12, the feed composition would first be rich in propylene, then gradually becomes richer in ethylene up to a maximum and then gradually becomes richer in propylene again. In this instance valves 5, 16, 19, 22, 25, 27, 30A and 38 are closed and valves 7, 15, 20, 23 and 24 are open. Other types of copolymers can be produced by utilizing any one, two or all three feed tanks 10, 11 and 12 simultaneously and/or sequentially in one or more feed operations. Suitable gas mixing devices can be installed in tanks 10, 11 and 12 to ensure rapid mixing of the gases in said tanks to provide rapid flow operations.

EXAMPLE

Tank 12 was charged with propylene to a pressure of 75 psig from source 28 through regulator 34A and valves 30A and 24. Then charging valves 20 and 7 were opened (all other valves being closed) to admit propylene into the reactor which had been previously charged with 300 ml of dry, degassed hexane, 10 mmols of titanium trichloride and 30 mmols of aluminum diethylchloride. The reactor 1 was maintained at room temperature (23°–25° C). Tanks 10, 11 and 12 had a capacity of 500 cc each. Propylene was fed into tank 12 unitl the pressure in tank 12 was 75 psig and then fed to the reactor 1 until the pressure dropped to 15 psig which took about 30 minutes whereupon more propylene was charged into tank 12 to bring the pressure up to 30 psig. The propylene was then passed to the reactor 1 over a period of about 15 minutes until the pressure in tank 12 reached 15 psig. This amounted to approximately 2500 cc of propylene over a period of three-fourth of an hour.

Thereafter, tank 12 was charged to 75 psig with propylene from source 28 through regulator 34A and valves 30A and 24. Tank 11 was charged to 75 psig with ethylene from source 29 through regulator 34B and valves 25 and 23. Tank 10 was charged to 75 psig with propylene from source 28 through regulator 34A and valve 22. Valves 15, 23, 24, 20 and 7 were opened (all others being closed) so that the contents of tank 10 flowed into the contents of tank 11 which flowed into the contents of tank 12 which flowed into the reactor 1. These valves were allowed to remain open until the pressure in tanks 10, 11 and 12 dropped to approximately 5 psig. Thereafter, additional propylene was added to tanks 12 and 11 to bring the pressure of said tanks up to 15 psig. Valves 23, 24, 20 and 7 were again opened so that the contents of tanks 11 flowed into the contents of tank 12 which flowed into the reactor 1 for polymerization unitl the pressure in tanks 11 and 12 reached about 5 psig. This amounted to the addition for polymerization of about 7500 cc of the total olefinic monomers over a period of about two hours. Thereafter, all valves were closed and tank 12 was charged with propylene to a pressure of 75 psig by opening the appropriate valves from the propylene supply source 28. Thereafter, appropriate valves were opened to allow the propylene in tank 12 to pass to the reactor for polymerization until the pressure in tank 12 fell to 15 psig. Tank 12 was recharged again with propylene to 30 psig and discharged into the reactor to 15 psig. At this point, valves were shut and the polymerization was continued for a short time to ensure essentially complete polymerization. The amount of propylene added to this last addition was approximately 2500 cc over a period of three-fourth hour. The feed rate of the olefin gas was about 55.56 cc per minute over a period of 3¾hour. The yield was 24.9 grams of copolymer having an overall ethylene content of 20 volume present and the following properties:

Tensile monulus (psi) — 65,800
Tensile strength (psi) — 5,290
Elongation at break (%) — 760
Pendulum impact strength (ft.lb./in.$^3$) — 370
Melt index (220° C, 1P — No flow While the above-described apparatus provides definite advantages in the copolymerization of olefinic monomers, it can be used to produce a wide variety of different types of other copolymers, for example, ethylenee oxidepropylene oxide copolymers from gaseous monomers. The properties of the resulting copolymers depend a great deal upon the sequence and composition of the monomers or monomer mixtures being polymerized. This invention, therefore, enables the manufacture of a wide variety of copolymers having a wide variety of properties and uses. The copolymers of this invention are useful in the production of the wide variety of articles for which thermoplastic materials are normally used including films, molded articles, coatings and the like.

What is claimed is:

1. Apparatus for copolymerizing at least two gaseous monomers comprising:
   A. a closed reactor for receiving said monomers and subjecting them to copolymerizing conditions;
   B. at least three feed tanks for containing said monomers under pressure under conditions which preclude copolymerization;
   C. a first feed manifold connected to one end of each said tank and to said reactor;
   D. first valve means in said first feed manifold for controlling flow therein between the first and second of said feed tanks. for controlling flow therein between the second and third of said feed tanks and for controlling flow therein between said feed tanks and said reactor;
   E. a second feed manifold connected to the other end of each of said feed tanks and to said reactor;
   F. second valve means in said second feed manifold for controlling flow from each of said three feed tanks into said second feed manifold; and
   G. third valve means in said second feed manifold for controlling flow therein between said first and second tanks and for controlling flow therein between all said feed tanks and said reactor.

2. Apparatus as claimed in claim 1 wherein one of said manifolds is connected to sources of each of said gaseous monomers for filling said feed tanks with said gaseous monomers and for feeding one or more of said gaseous monomers directly to said reactor.

3. Apparatus as claimed in claim 2 including check valves disposed between said sources andd said feed tanks to permit flow from said sources to said feed tanks but not from said feed tanks back to said sources.

4. Apparatus as claimed in claim 1 wherein there is provided a check valve in said first manifold between said first and second feed tanks permitting flow therein from said first to said second feed tank but not from said second to said first feed tank.

5. Apparatus as claimed in claim 1 wherein there is provided a check valve in said second manifold between said second and said third feed tanks permitting flow therein from said second to said third feed tank but not from said third to said second feed tank.

6. Apparatus as claimed in claim 1 wherein a source of hydrogen gas is connected to one of said manifolds through a check valve for permitting hydrogen to pass into said manifold and ultimately to said reactor for chain transfer purposes but prevents flow from said manifold to said source.

7. Apparatus as claimed in claim 1 wherein a source of nitrogen gas is connected to one of said manifolds through a check valve for permitting nitrogen to pass into said manifold and ultimately throughout said system for purging purposes but prevents flow from said manifold to said source.

8. Apparatus as claimed in claim 3 wherein pressure regulating means are provided at said sources of gaseous monomers for regulating the flow of gaseous monomer therefrom.

9. Apparatus as claimed in claim 1 wherein there is provided pressure regulating means between said manifolds and said inner reactor for regulating the flow of gaseous monomers into said reactor.

* * * * *